United States Patent [19]
Barmore, Jr. et al.

[11] Patent Number: 5,874,899
[45] Date of Patent: Feb. 23, 1999

[54] TANK LEVEL GAUGE AND SENSOR HEAD THEREFOR

[75] Inventors: Gaston C. Barmore, Jr., Pearland; Richard G. Fenner, Houston; Clyde D. Ridgeway, Baytown, all of Tex.

[73] Assignee: Midland Manufacturing Corp., Skokie, Ill.

[21] Appl. No.: 20,041

[22] Filed: Feb. 6, 1998

[51] Int. Cl.⁶ ................................................. G08B 21/00
[52] U.S. Cl. ..................... 340/623; 340/618; 340/619; 340/620; 340/624; 73/313; 73/319
[58] Field of Search .................... 340/623, 618, 340/619, 620, 624; 73/290, 305, 306, 307, 313, 319, 317

[56] References Cited

U.S. PATENT DOCUMENTS

| 4,320,394 | 3/1982 | John, Jr. .................................. 340/618 |
| 4,804,944 | 2/1989 | Golladay et al. ...................... 340/624 |
| 5,124,686 | 6/1992 | White et al. ........................... 340/624 |
| 5,585,786 | 12/1996 | Clark et al. ............................. 340/623 |

*Primary Examiner*—Jeffery A. Hofsass
*Assistant Examiner*—Davetta Woods
*Attorney, Agent, or Firm*—Emrich & Dithmar

[57] ABSTRACT

A universal read head for a tank-level float gauge is adapted for use with any of certain different types of gauge rods which may be connected to a float element in the tank, including rods having an optical code thereon including a plurality of alternating reflecting and non-reflecting stripes arranged between magnetic end portions, and a rod with one or more magnets disposed adjacent to each end thereof and longitudinally spaced magnets intermediate the ends. The sensing head includes an LED light source for illuminating the rod and two phototransistors coupled in quadrature relationship for detecting the illuminated optical code patterns, and two magnetic reed switches for sensing the proximity of magnets on the gauge rod. The sensors are coupled to a microprocessor for interpreting the electrical signals generated by the sensors to identify the type of gauge rod being used and to provide an indication of the position of the gauge rod relative to the sensors.

20 Claims, 11 Drawing Sheets

TANK LEVEL GAUGE AND SENSOR HEAD THEREFOR

BACKGROUND OF THE INVENTION

1. Field of the Invention

The present invention relates to gauge systems for indicating the level of liquid lading in a tank and, particularly, to electronic gauges of the type which can produce an alarm signal and/or an indication of tank liquid level. The invention has particular application to a sensing head for such a gauge system.

2. Description of the Prior Art

The present invention is an improvement of tank level gauge systems of the general types disclosed, e.g., in U.S. Pat. Nos. 5,124,686 and 5,585,786. Both of these prior systems are float gauges, which utilize a float which rises and falls with the liquid level along a fixed guide tube, which extends into the tank from the top thereof. The float carries a magnet for magnetic coupling to a magnet adjacent to an end of a gauge rod or tube, which is movable longitudinally within the guide tube so that the rod rises and falls with the float. U.S. Pat. No. 5,124,686 discloses a magnetic system, which has a pair of spaced magnets adjacent to the top end of the rod, which actuate a reed switch in a sensor head at the top of the guide tube. A similar pair of magnets may be disposed adjacent to the bottom end of the rod. At least one other magnet is disposed intermediate the ends of the gauge rod for indicating significant tank levels when sensed by the reed switch. U.S. Pat. No. 5,585,786 discloses an optical system, wherein the gauge rod is provided with a code pattern including a plurality of longitudinally alternating light and dark circumferential stripes. In this case the sensing head has a light source to illuminate the rod and photosensors arranged in quadrature relationship to detect the passage of the stripes to indicate rate and direction of movement of the rod. The ends of the rod have elongated dark regions to indicate these reference positions.

While these prior systems work reasonably well, they have certain disadvantages. The magnetic system provides only gross indications of a few significant liquid levels. While the optical system is capable of providing a relatively precise and continuous indication of liquid level, the optical system has proven to be unreliable in detecting the ends of the gauge rod, resulting in spurious readings.

SUMMARY OF THE INVENTION

It is a general object of the present invention to provide an improved gauging system which avoids the disadvantages of prior systems while affording additional structural and operating advantages.

An important feature of the invention is the provision of a liquid level gauge which permits relatively precise and continuous level readings, while at the same time providing unambiguous indication of high and low reference levels.

In connection with the foregoing feature, it is another feature of the invention to provide a gauge system of the type set forth which can utilize different types of gauge rods, including magnetic features and optical code features.

Still another feature of the invention is the provision of a system of the type set forth which is of relatively simple and economical construction.

Another feature of the invention is the provision of a universal sensing head for a gauge system of the type set forth which is capable of sensing both purely magnetic gauge rods and gauge rods including both optical code and magnetic features.

Certain ones of these and other features of the invention may be attained by providing a universal sensor head for use with different types of elongated gauge rods in a gauge system for indicating the level of liquid in a tank, the sensor head comprising: a code sensor including two optical detectors disposed for cooperation to detect a linear code pattern on an associated gauge rod movable longitudinally past the code sensor and generating corresponding electrical signals to indicate the direction of movement of the gauge rod, a magnetic sensor including a magnet detector disposed for detecting proximity of a magnet on the associated gauge rod and generating corresponding electrical signals to establish a reference position of the gauge rod, and a processor coupled to the code sensor and to the magnetic sensor and operating under stored program control for interpreting the electrical signals and generating corresponding output signals indicative of the position of the gauge rod relative to the sensor head.

Other features of the invention may be attained by providing a linear distance gauge comprising: an elongated and longitudinally movable code-bearing surface, a fixed code sensor including two optical detectors disposed relative to the code-bearing surface for detecting the code thereon and generating corresponding electrical signals indicating the direction of movement of the code-bearing surface, at least one magnet disposed adjacent to an end of the code bearing surface, a fixed magnetic sensor including a magnet detector disposed for sensing proximity of the magnet and generating a corresponding electrical signal to establish a reference position of the code-bearing surface, and a processor coupled to the code sensor and to the magnetic sensor and operating under stored program control for interpreting the electrical signals and generating corresponding output signals indicating the position of the code-bearing surface relative to said sensors.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
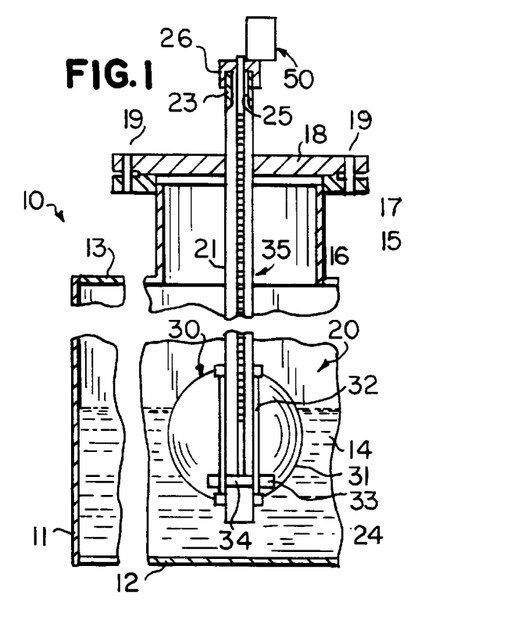
FIG. 1 is a fragmentary view in vertical section of a portion of a tank in which is mounted a tank-level gauge constructed in accordance with and embodying the features of the present invention, illustrating the gauge in its position when the tank is nearly empty.

Referring to FIG. 1, there is illustrated a tank 10, with which the present invention may be used. The tank 10 is a generalized tank for purposes of illustration, and it will be appreciated that specific types of tanks, such as barge tanks or railway car tanks, e.g., may differ in specific structural details. The tank 10 has a side wall 11, a bottom wall 12 and a top wall 13. A liquid lading 14 may be stored within the tank 10. The top wall 13 has an opening therein with which a nozzle 15 is aligned. The nozzle 15 extends upwardly from the top wall 13 and includes a cylinder 16 welded thereto. A ring-shaped flange 17 is welded to the top of the cylinder 16 and a mounting plate 18 is attached to the flange 17, as by bolts 19 (only two of which are shown).

A gauge 20, constructed in accordance with and embodying the features of the present invention is provided for determining the level of the liquid 14 within the tank 10. The gauge 20 includes an elongated guide tube 21 which is preferably composed of corrosion-resistant, non-magnetic material in order to withstand corrosive liquids which may be stored in the tank 10. The guide tube 21 extends through a complementary opening in the mounting plate 18, and is fixed thereto, as by welding. The guide tube 21 has an upper end 23 which may be externally threaded. A sealing plug or cap 24 is fixed on the lower end of the guide tube 21. A bushing 25 is disposed in the upper end 23 of the guide tube 21 and has an axial bore therethrough. An inverted, cup-shaped cap 26 closes the upper end 23 of the guide tube 21 and may be threadedly engaged therewith, the cap 26 having an axial bore therethrough coaxial with the bore in the bushing 25.

The gauge 20 includes a float 30, having a hollow, substantially spherical shell 31 and a central tube 32 hermetically attached together. The guide tube 21 passes coaxially through the float tube 32 so that the float 30 can freely move along the guide tube 21 with change in liquid level. The float 30 is also preferably made of a corrosion-resistant, non-magnetic material. A ring-shaped magnet 33 is mounted within the float 30 and encircles the tube 32 being fixed to the tube 32 and/or to the inner surface of the shell 31. The gauge 20 also includes an elongated, cylindrical gauge rod or tube 35 which is disposed coaxially within the guide tube 21, with the upper end of the gauge rod 35 extending through the coaxial bores in the bushing 25 and the cap 26. Fixed to the lower end of the gauge rod 35 is a cylindrical magnet 34, which magnetically couples the gauge rod 35 to the float magnet 33 and, thereby, to the float 30, in a known manner, so that the gauge rod 35 rises and falls with the float 30 as the level of the liquid 14 rises and falls.

Figure 2:
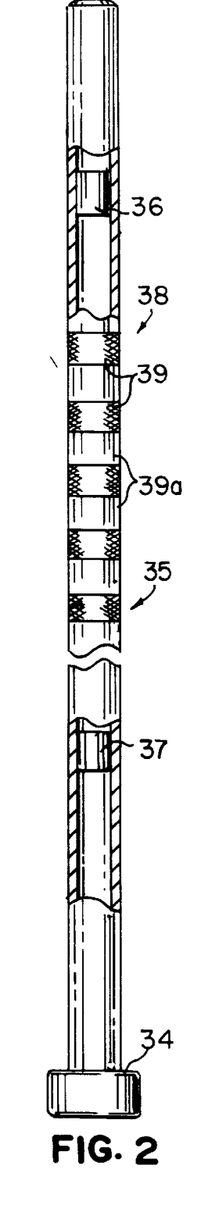
FIG. 2 is an enlarged side elevational view of the gauge rod of the gauge of FIG. 1, in partial section and with portions broken away.

Referring also to FIG. 2, the gauge rod 35 has fixed therein two permanent magnets 36 and 37, respectively adjacent to the upper and lower ends of the rod. The rod 35 also has a cylindrical code-bearing outer surface 38 including a long reflective region at the top of the rod and, extending between the magnets 36 and 37, a series of alternating dark or non-reflecting stripes 39 and light or reflecting stripes 39a, each extending around the circumference of the surface 38 and each having the same longitudinal height. It will be appreciated that the stripes 39 and 39a comprise optical code indicia of the code-bearing surface 38.

Figure 4:
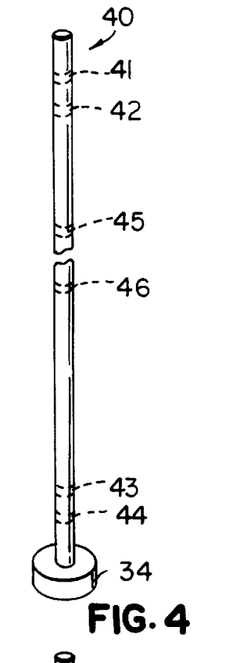
FIG. 4 is a perspective view, with portions broken away, of another type of gauge rod usable with the gauge of FIG. 1.

It is a significant aspect of the invention, that it is also usable with other types of gauge rods, such as the magnetic gauge rod 40 illustrated in FIG. 4. The rod 40 is similar in size to the gauge rod 35 and is also provided with the cylindrical coupling magnet 34 at the lower end thereof. However, the gauge rod 40 includes a pair of magnets 41 and 42 adjacent to the upper end of the rod and a pair of magnets 43 and 44 adjacent to the lower end of the rod. Additionally, zone-indicating magnets 45 and 46 are disposed at predetermined spaced locations intermediate the ends of the rod. These divide the rod into three zones, viz., a "green zone 47, an "amber" zone 48 and a "red" zone 49. While two of the zone magnets 45 and 46 are illustrated, it will be appreciated that any number could be provided, depending upon the length of the gauge rod and the number of zones desired.

Figure 3:
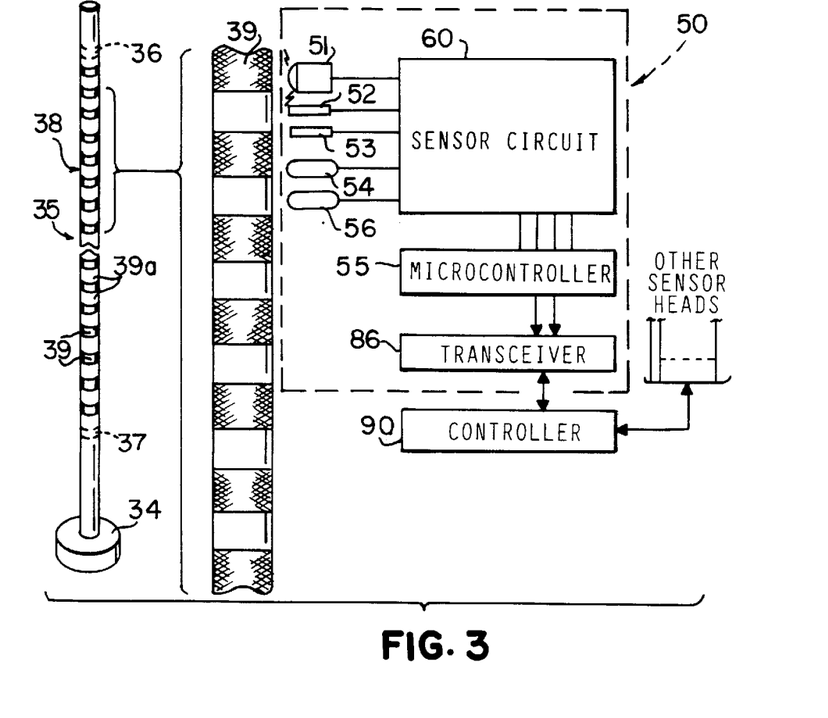
FIG. 3 is an enlarged diagrammatic view of the sensor head of the tank level gauge of FIG. 1, showing cooperation thereof with the associated gauge rod.

The gauge 20 also includes a sensor head 50, which may be mounted on the cap 26 alongside the gauge rod 35, as illustrated in FIG. 1. The contents of the sensor head 50 are illustrated in functional block form in FIG. 3 and in schematic form in FIG. 5. The sensor head 50 includes a light source, such as a light-emitting diode ("LED") 51, disposed for illuminating the adjacent portion of the code-bearing surface 38. The LED 51 is disposed adjacent to two optical sensors, preferably phototransistors 52 and 53, which are arranged in quadrature relationship relative to the code-bearing surface 38. More particularly, the phototransistors 52 and 53 are preferably disposed 90° out of phase with each other, as is explained in greater detail in the aforementioned U.S. Pat. No. 5,585,786. The phototransistors 52 and 53 are spectrally matched to the LED 51, which may be an infrared LED. The sensor head 50 also includes a magnetic sensor including two magnetic detectors, preferably in the form of reed switches 54 and 56, which are preferably spaced apart a distance such that they will be simultaneously actuated by the magnets 41 and 42 or the magnets 43 and 44 of the magnetic gauge rod 40 (FIG. 4) when the rod is in its lowermost or uppermost position. The magnets 36 and 37 of the gauge rod 35 are so positioned that they respectively actuate the switch 54 when the rod is in its lowermost and uppermost positions. In this regard, the magnets of each pair 41, 42 and 43, 44 are positioned so that, as the rod moves from its lowermost position, the trailing magnet of the pair 41, 42 will release switch 56 and acquire switch 54 before switch 54 is released by the lead magnet. Similarly, as the rod moves from its uppermost position the trailing magnet of the pair 43, 44 will release switch 54 and acquire switch 56 before switch 56 is released by the lead magnet. Thus, the switches cannot move directly from a "both held" condition to a "both released" condition or vice versa.

Figures 5, 6:
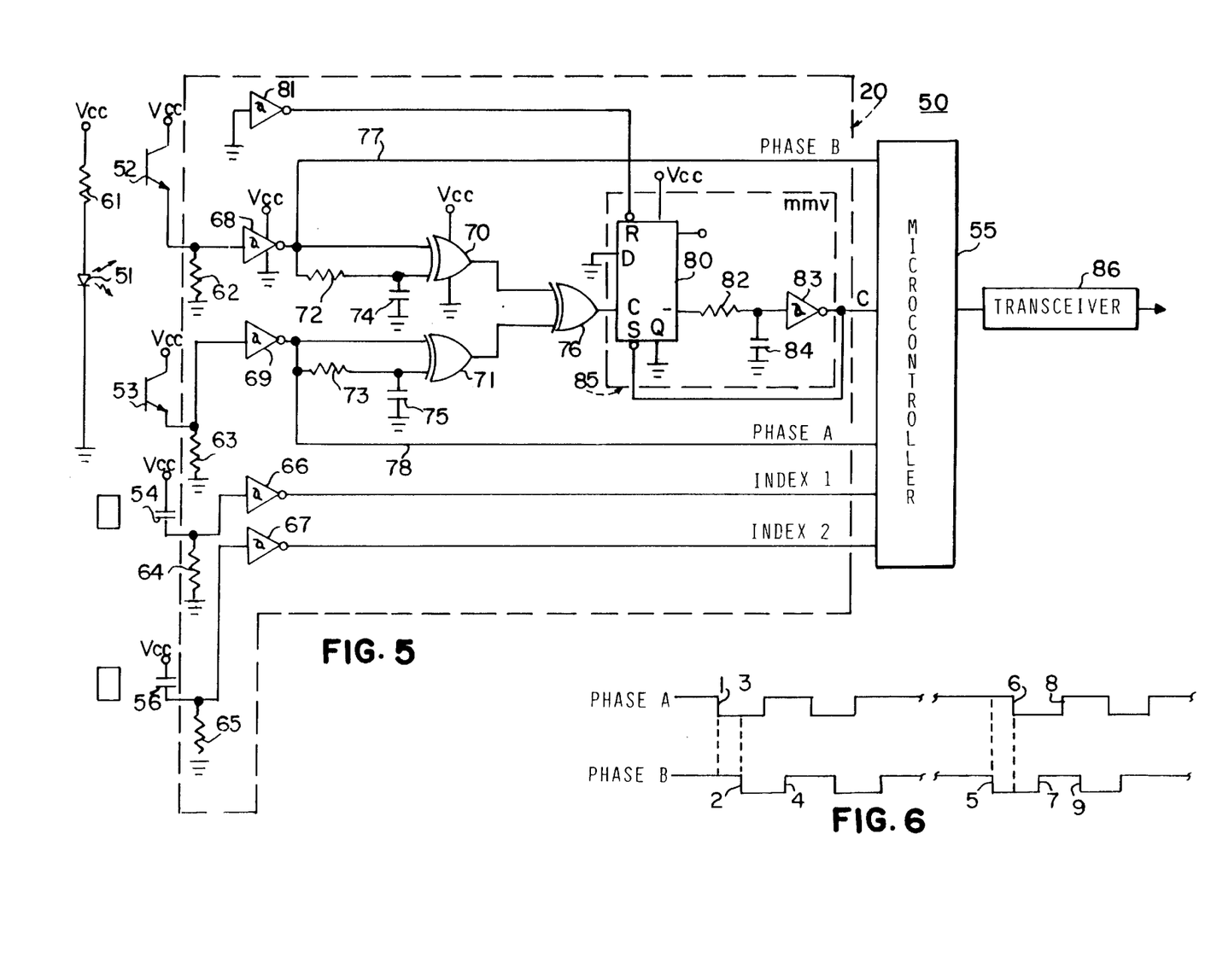
FIG. 5 is a partially schematic and partially functional diagrammatic illustration of the circuitry of the sensor head of FIG. 3.
FIG. 6 is a waveform diagram of output signals from the optical sensors of the sensor head.

The LED 51, the phototransistors 52 and 53 and the reed switches 54 and 56 are all coupled to a microcontroller 55 through a sensor circuit 60, the details of which are shown in FIG. 5. It will be appreciated that the sensor circuit 60 includes a suitable power supply (not shown) adapted to be coupled to an associated AC and/or DC source for generating a supply voltage $V_{cc}$. The LED 51 has its anode connected through a resistor 61 to the $V_{cc}$ supply and its cathode connected to ground. The phototransistors 52 and 53 have their collectors connected to the $V_{cc}$ supply and their emitters connected to ground, respectively through resistors 62 and 63. Similarly, the reed switches 54 and 56 are, respectively, connected in series with resistors 64 and 65 between $V_{cc}$ supply and ground. The reed switches 54 and 56 are also respectively coupled through inverters 66 and 67 to the microcontroller 55, for respectively providing to the microcontroller 55 INDEX 1 and INDEX 2 signals. The emitters of the phototransistors 52 and 53 are, respectively, connected through inverters 68 and 69 to first inputs of two exclusive OR gates 70 and 71, the outputs of the inverters 68 and 69 also being coupled through resistors 72 and 73, respectively, to the second inputs of the exclusive OR gates 70 and 71, which second inputs are also coupled to ground, respectively, through capacitors 74 and 75. The outputs of the exclusive OR gates 70 and 71 are coupled, respectively, to the inputs of an exclusive OR gate 76. The outputs of the inverters 68 and 69 are also coupled, respectively, via conductors 77 and 78, directly to the microcontroller 55 for respectively providing PHASE A and PHASE B signals thereto. It will be appreciated that each of the gates 70, 71 and 76 and each of the inverters 66–69, 81 and 83 is coupled to the $V_{cc}$ supply but, since the gates may be on a common chip and the inverters may be on a common chip, only one supply connection is shown for each.

The output of the exclusive OR gate 76 is connected to the clock input of a D-type flip-flop 80, which has a grounded D terminal and a reset terminal connected to the output of an inverter 81, the input of which is connected to ground. The output of the flip-flop 80 is connected to the microcontroller 55 through a resistor 82 and inverter an 83, the input to the inverter 83 also being connected to ground through a capacitor 84. The output of the inverter 83 is also connected to the set terminal of the flip-flop 80. The microcontroller 55 is coupled through a transceiver 86 to a central controller 90 (FIG. 3), which may also be connected to other sensor heads like the sensor head 50 in other tanks. For example, the tank 10 may be on a barge which may include a plurality of similar like tanks, each of which is provided with its own gauge 20, all under the control of the central controller 90.

In operation, the phototransistors 52 and 53 cooperate to detect the passage of the stripes 39, 39a of the gauge rod 35, in a manner described in greater detail in the aforementioned U.S. Pat. No. 5,585,786. Each of the transistors 52, 53 has a substantially sine wave output. The inverters 68 and 69 are preferably Schmitt-trigger inverters which convert the sine wave signals to square waves. Each of the exclusive OR gates 70 and 71 functions as an edge-triggered, 1-microsecond, one-shot multivibrator, which generates pulses on each edge of the incoming square wave signal. These pulse outputs are combined in the exclusive OR gate 76 to provide a clock input signal to the flip-flop 80. The flip-flop 80 cooperates with the inverter 83 to form a 3.8-microsecond monostable multivibrator which generates a clock input signal to the microcontroller 55 and a set signal to the flip-flop 80 for each phase edge detected. The inverter 81 provides a positive reset signal to the flip-flop 80.

The microcontroller 55 is preferably an 8-bit microcontroller with 4k bytes of internal program memory, and operates under stored program control to decode the quadrature PHASE signals generated by the phototransistors 52 and 53 and the INDEX signals provided by the reed switches 54 and 56 to determine position and direction of movement of the gauge rod 35 (or 40). This data is then formatted and transmitted to the central controller 90 through the transceiver 86. The software program includes algorithms which permit the microcontroller 55 to identify which type of gauge rod is being used and to properly interpret the signals therefrom. The transceiver 86 may be an RS-485 half-duplex transceiver.

Referring now to FIGS. 7–12, there are illustrated flow charts for the software program controlling the operation of the microcontroller 55. By way of initial background, it is important to note that the system is referenced to a "top-of-rod" condition, wherein the liquid level in the tank is low so that the gauge rod is at its lowermost position, with the top of the rod disposed adjacent to the sensor head 50. Furthermore, the sensor head 50 can be mounted in place and removed only when the gauge rod 35 (or 40) is in its lowermost position and the system, when energized, can detect the mounting and demounting of the sensor head 50 because each such operation will result in a unique sequence of responses on the INDEX 1 and 2 lines. Physical head removal is referred to hereinafter as a "Head off," "HEAD-OFF" or "HDOFF" condition or status.

Figure 7A:
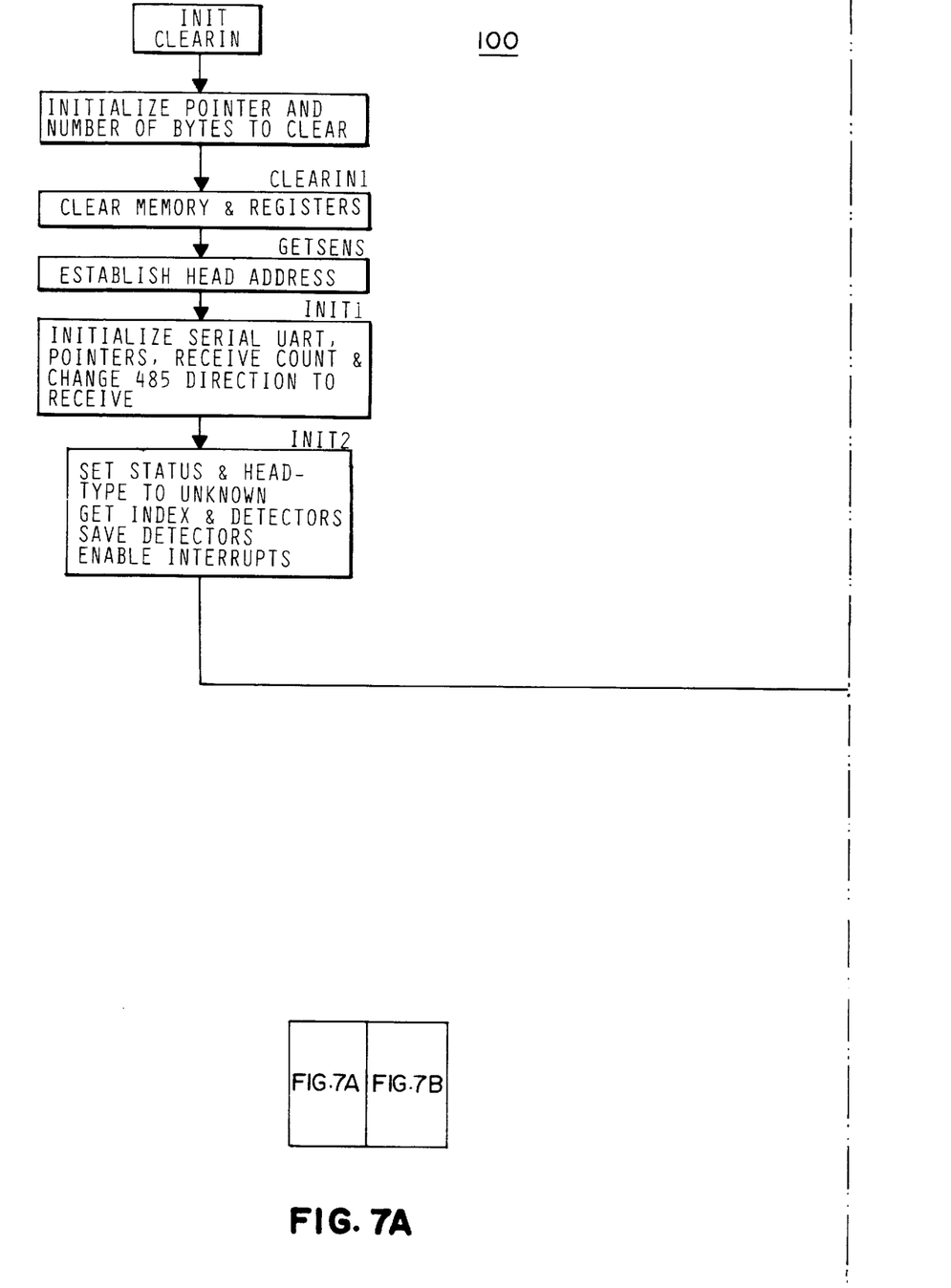
FIGS. 7–12 are flow diagrams of the software program for the microcontroller of the circuit of FIG. 5.
Figure 7B:
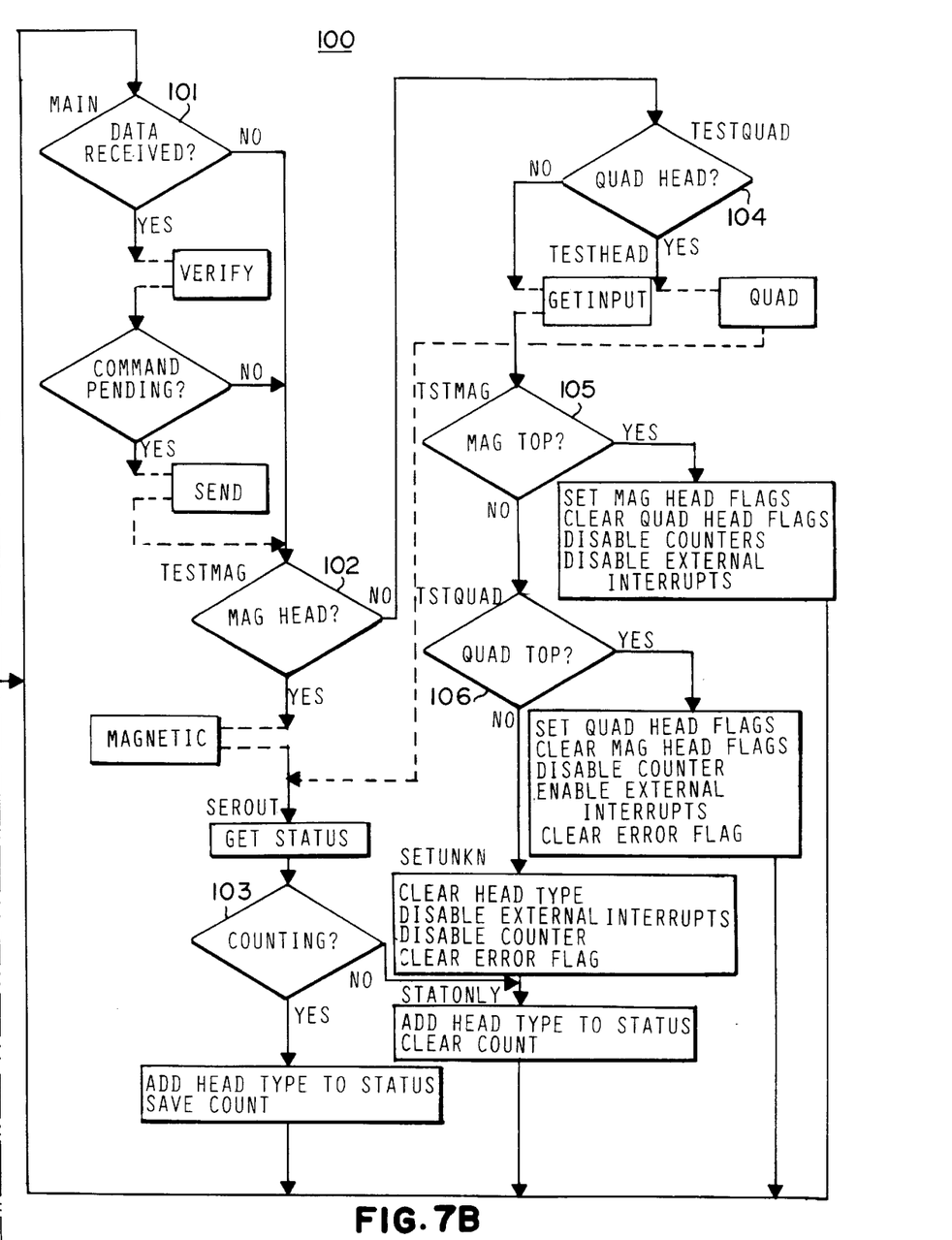

When the system is initially powered up, it goes through an initialization, supervisory and head determining routine 100, illustrated in FIG. 7. The system first goes through a series of initialization stages and then enters a main supervisory loop at 101 to check if any data has been received from the system controller 90. If it has, the system goes through a VERIFY subroutine to verify that the incoming address is for this head, checks to see if the received data constitutes a polling command seeking head status and, if so, enters a SEND subroutine, illustrated in FIG. 8 and more fully described below, for sending the head status information to the system controller 90. The routine then checks at 102 to determine whether or not the head is operating as a magnetic head, i.e., that it is being used with a magnetic gauge rod 40, which is uniquely indicated if both of the magnetic switches 54 and 56 are actuated. If it is, the program enters a MAGNETIC subroutine, illustrated in FIG. 9, to ascertain the status of the sensor switches 54 and 56, as will be explained more fully below. The routine then gets the head status and adds it to the head type, and either saves or clears the count, depending upon whether or not the system is counting passes through the subroutine at 103.

If, at 101, data has not been received, the routine proceeds immediately to test whether the system is operating as a magnetic head at 102. If it is not, it checks at 104 to see if a quadrature head has been detected. If it has, it enters a QUAD routine, illustrated in FIG. 10, to check the status of the sensors 52–54 and 56, as will be explained in greater detail below, and then proceeds to get that status information and proceed as before. If, at 104, a quadrature head is detected, the system proceeds to a GETINPUT subroutine to debounce and obtain the condition of the magnetic switches 54, 56, and then checks at 105 to see if the system is indicating that it is at the top of the magnetic rod 40. If so, it sets the appropriate flags and clears the quadrature head flags, disables the counter and disables the external interrupt subroutine illustrated in FIG. 11, which is used only with quadrature rods, as will be explained more fully below. If, at 105, the system does not detect the top of a magnetic rod, it checks at 106 to see if it is at the top of a quadrature rod 35. If so, it sets the quadrature head flags and clears the magnetic flags, disables the counter and enables the external interrupt. If the top of the quadrature rod is not detected at 106, the system sets itself in an unknown condition and returns through the loop. When in this condition, the head will respond to system controller polls, by essentially indicating that it does not know what type of rod is being used and where the rod is located and needs more information. In this condition, it is necessary for the tanker-man to manually depress the rod to its lowermost position, so that the system can detect the top-of-rod condition to establish its reference position and identify the type of rod.

Figure 8:
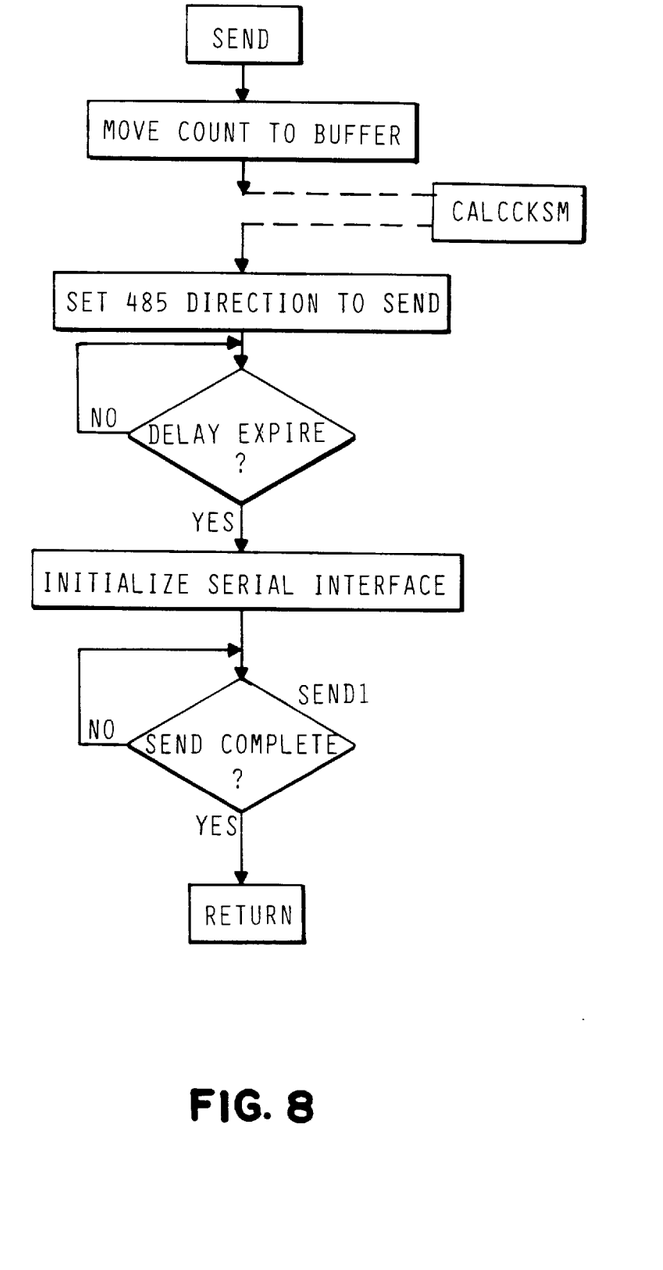

Referring to FIG. 8, in the SEND subroutine, after the count is moved to a buffer, the routine calls a further CALCCKSM subroutine to calculate the check sum, this preferably being a routine for implementing Fletcher's algorithm. Then the transceiver 86 is enabled for transmit and the system then waits for the RS-485 line to settle, initializes the interface and then transmits the data until the transmission is complete and then returns.

Figure 9A:
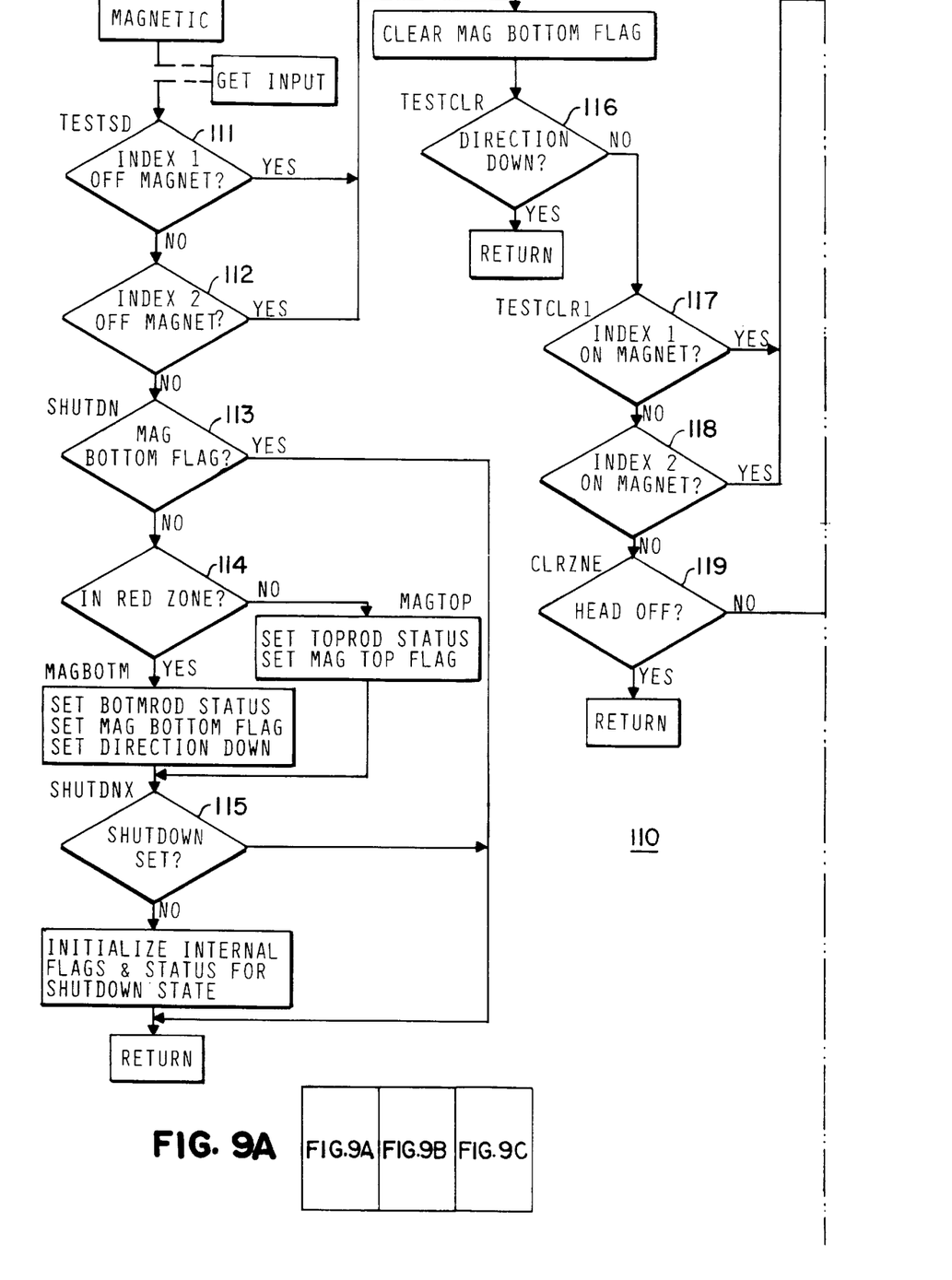
Figure 9B:
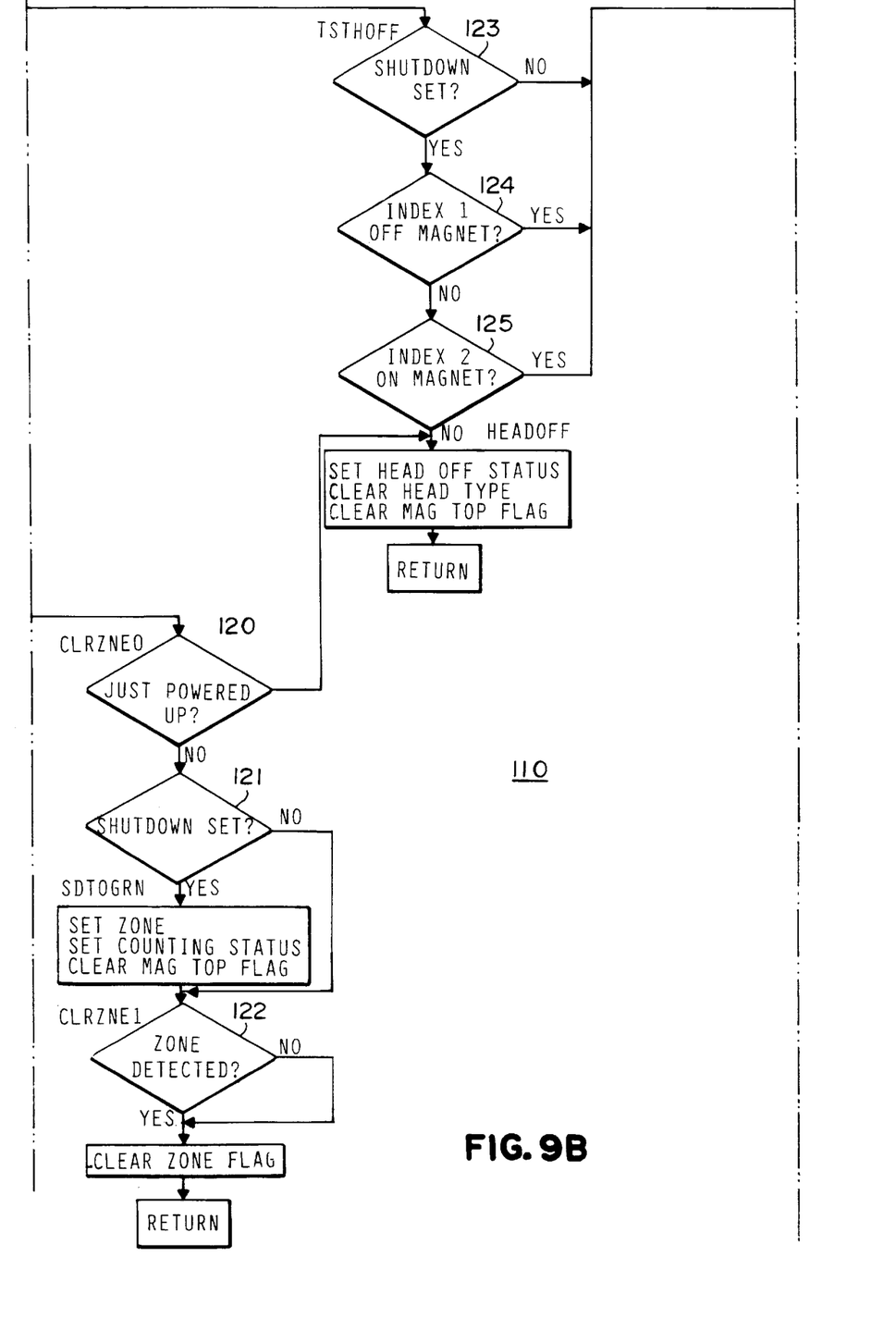
Figure 9C:
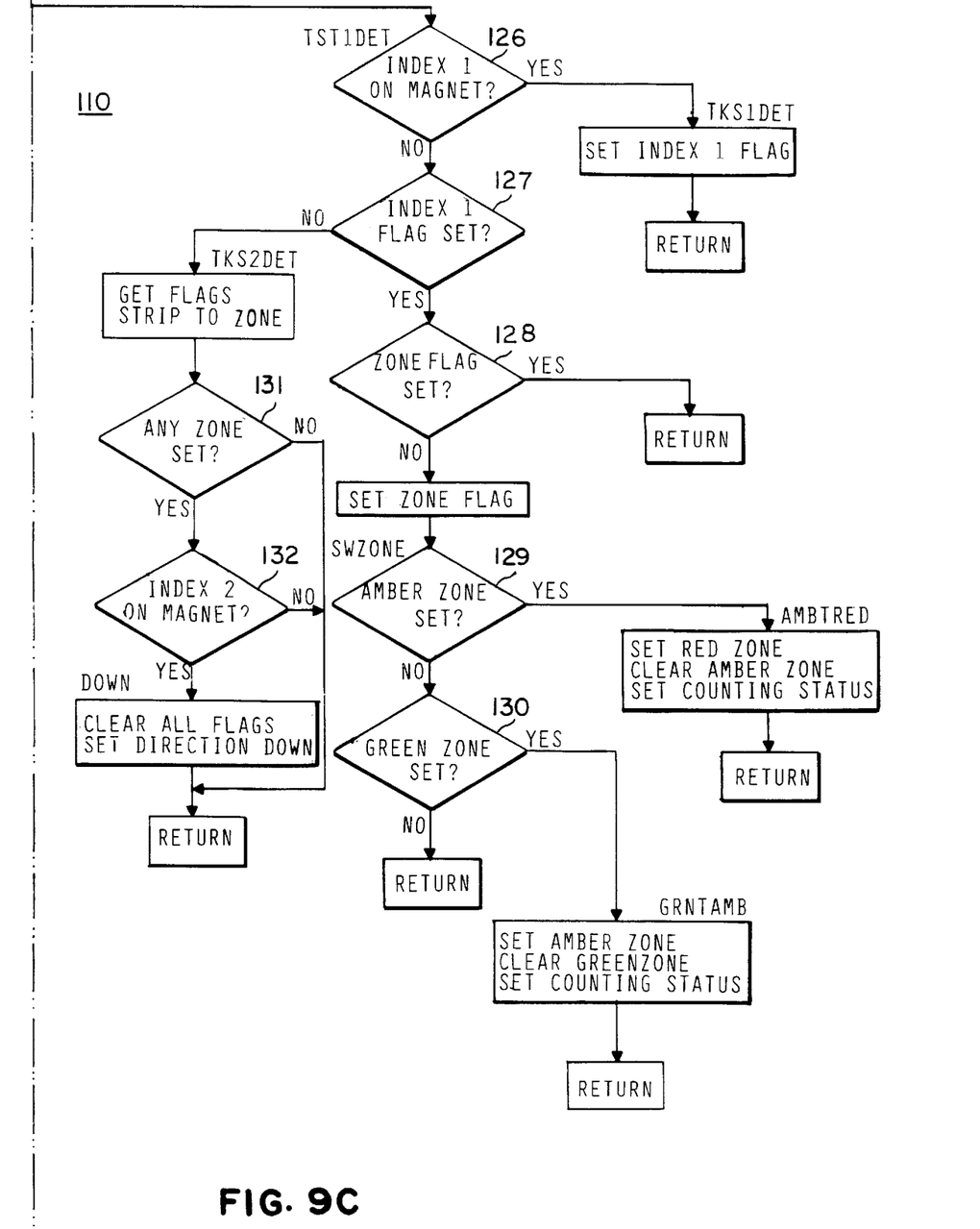

Referring to FIG. 9, the magnetic subroutine for checking the magnetic status of the sensor head 50, is generally designated 110. The routine first calls the GETINPUT subroutine to obtain the states of all of the sensors and then, at 111 and 112 checks to see of either of the magnetic reed switches 54 or 56 is deactuated. If not, the program checks at 113 to see if the system has already detected the bottom of the rod, i.e., that the rod is in its uppermost positiocondition of the overfill condition of the tank. If so, the program returns to the main loop and, if not, the program checks at 114 to see if the rod was last in the red zone, i.e., the zone closest to the bottom of the rod. If so, it must currently be at the bottom of the rod and the appropriate status and flags are set and the down direction is set, since the rod cannot move any further in the up direction. If, at 114, the rod was not last in the red zone, then it must be at the top of the rod and the appropriate status and flags are set. The program then checks at 115 to see if it is in a shutdown condition, i.e., that the bottom of the rod had already been detected. If so, it returns to the main loop and, if not, it sets the shutdown state before returning.

If, at 111, 112, either of the sensor switches 54, 56 is deactuated, then the sensor head 50 cannot be detecting the bottom of the rod, so that the magnetic bottom flag is cleared and the program then checks at 116 to see if the rod is moving down. If so, the tank is being emptied, so that the program returns to the main loop. If the direction is not down, the program next checks at 117, 118 to see if either of the reed switches 54, 56 is actuated. If not, the program checks at 119 to see if the head is off and, if so, returns to the main loop. If not, it checks at 120 to see if the system has just been powered up. If so, it forces a HEADOFF condition to be set and returns to the main loop. This is because at power up it might not be possible to tell the status of the rod, so this forces the operation to first move the rod down to its top-of-rod position to establish a reference. If the system has not just been powered up, the routine next checks at 121 to see if the tank shutdown flag had been set (indicating top of rod). If so, it must now be in the green zone, so it sets that zone, sets the counting status (to count zones) and clears the magnetic top flag and then, at 122, checks to see if a zone magnet has been detected. If not it returns and, if so, clears the zone flag before returning. If, at 121, the system was not in shutdown, the program would proceed directly to 122 without setting the green zone. If, at 117, 118, either of the magnetic switches 54, 56 was actuated, the system next checks to see if the head is being removed. First, at 123, it checks to see if the shutdown flag had been set, i.e., that the top of the rod had been detected in the last pass through the routine and, if so, checks at 124 and 125 to see if the bottom reed switch 56 is off and the top reed switch 54 is on. If so, the head has been removed and the HEADOFF status and flags are set. If all of the HEADOFF conditions are not set, the program next checks at 126 to see if the lower reed switch 56 is actuated and, if so, sets the appropriate flag and returns. If not, it checks at 127 to see if the reed switch 56 flag had been set in the last pass. If it had, the routine next checks at 128 to see if a zone flag had been set, indicating that the rod was in a zone between magnets. If it had, the program returns and if not, the program sets the zone flag and then checks to determine which zone it is in. If, at 129, the amber zone had been set then it must have moved into the red zone and the appropriate conditions are set before returning. If not, the program checks at 130 to see if the green zone has been set. If not, it returns and if so it must have moved into the amber zone and the appropriate conditions are set before returning.

If, at 127, the INDEX 1 flag for the bottom reed switch had not been set, the program then checks to see if any zone had been set at 131. If not, it returns and, if so, it checks at 132 to see if the upper reed switch 54 is actuated. If not, it returns and if so, the rod must be moving down and the appropriate flags are set and the down direction is set before returning.

Figure 10:
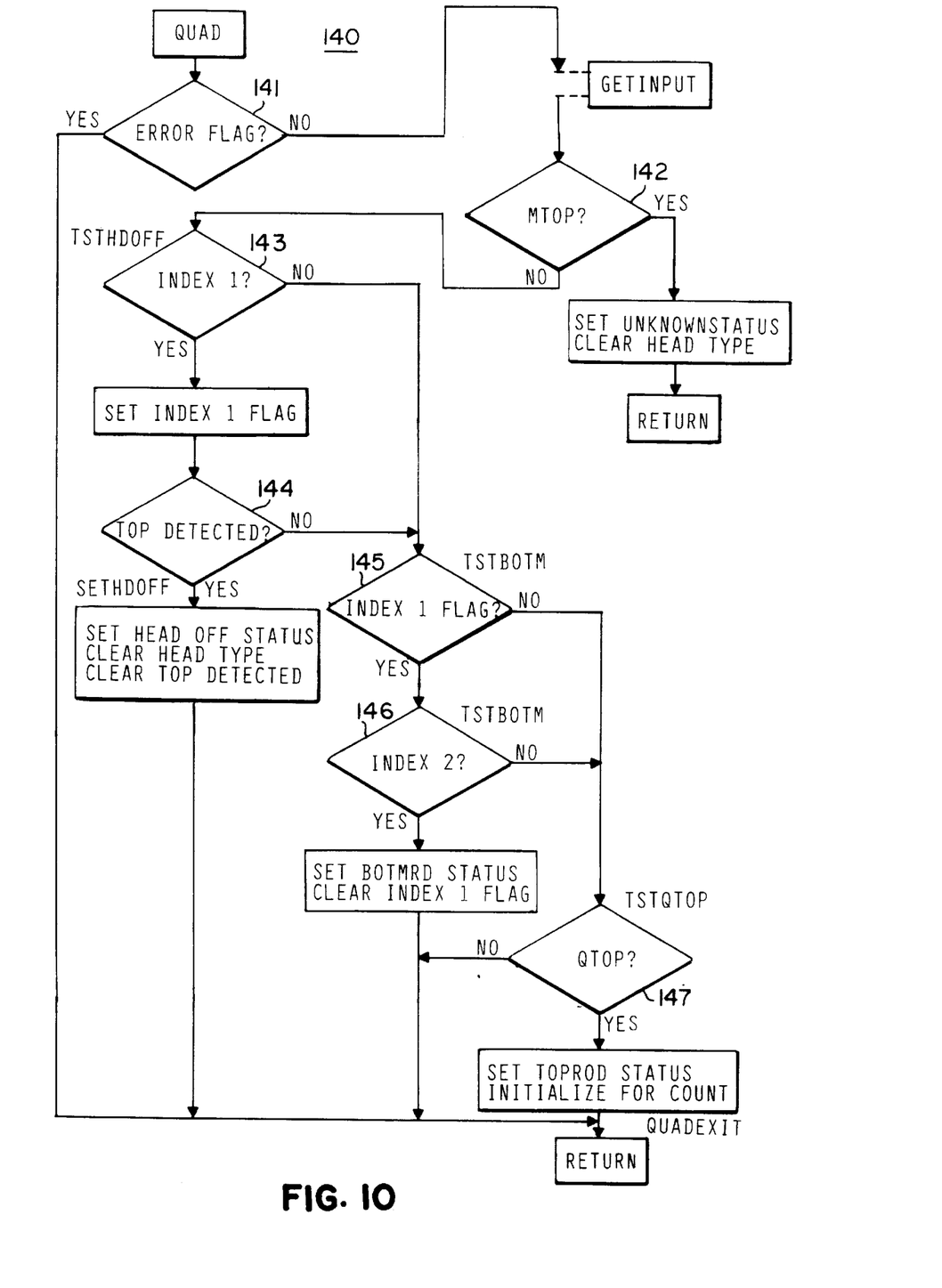

Referring to FIG. 10, the QUAD subroutine is designated as 140. This subroutine is entered after a quadrature gauge rod has been detected to determine the position of the rod. The routine first checks at 141 to see if an error flag has been set. If so, it returns and if not, calls the GETINPUT subroutine to acquire the status of the sensor and then checks at 142 to see of a magnetic head has been detected. If so, it enters the unknown status, indicating that it cannot tell what type of rod is in place, and returns. If the answer at decision 142 is no, the routine proceeds to check at 143 if the HDOFF condition has been detected, by checking to see if the bottom reed switch 56 is actuated. If so, the appropriate flag is set and the program checks at 144 to see if the top of the rod had been detected in the last pass. If so, the head has been removed and the appropriate state is set. If the answer is no at either of decisions 143 and 144, the head is not off and the program next checks at 145 and 146 to see if the head is at the bottom of the rod, by determining if the bottom reed switch 56 had been detected in the last pass and the upper reed switch 54 is currently actuated. If so, it is at the bottom of the rod and the appropriate status is set. If not, the program next checks to see if it is at the top of the rod at 147 and, if so, sets the appropriate status before returning to the main loop.

Figure 11:
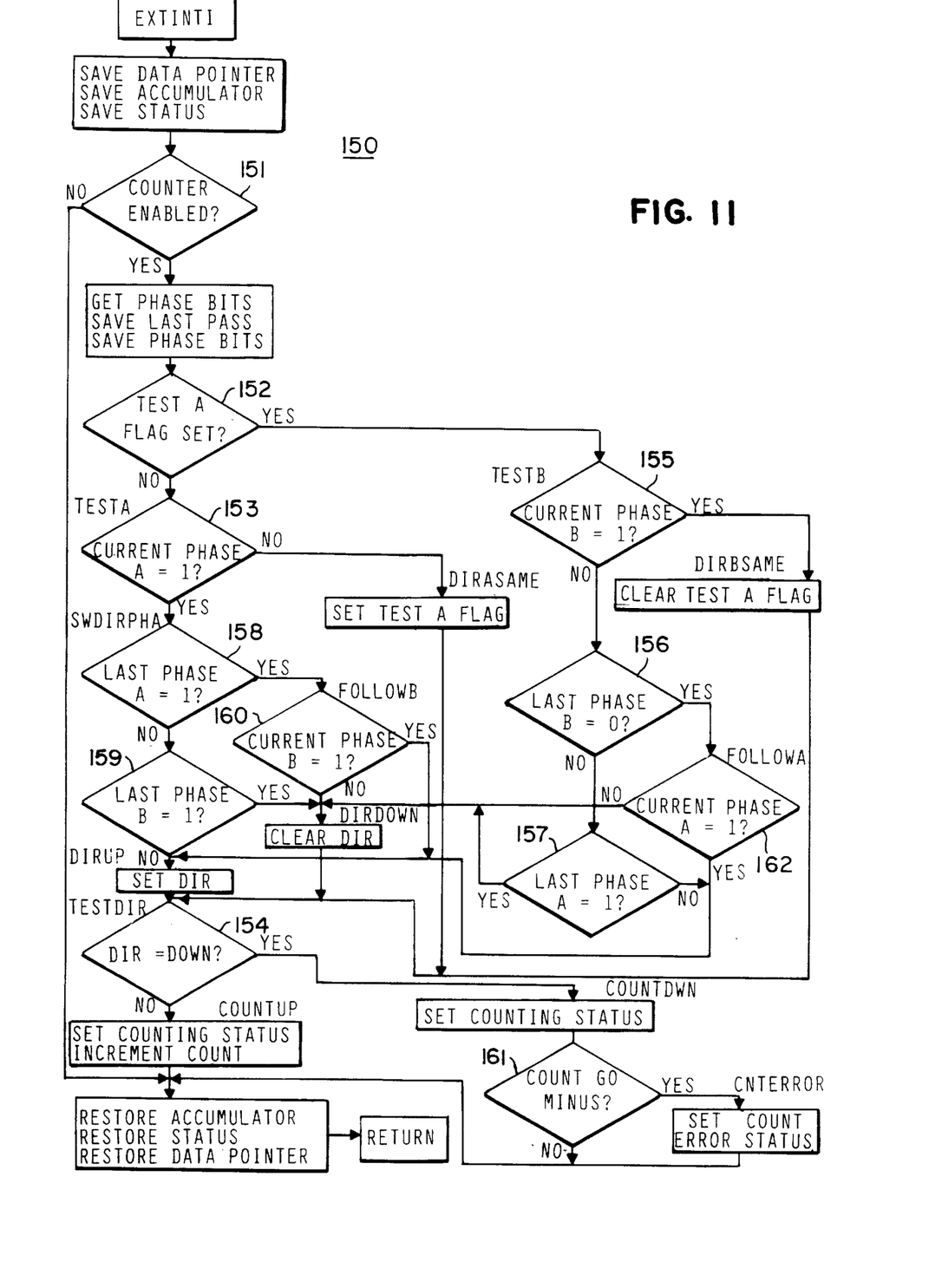

The system utilizes two types of interrupts, a serial interrupt each time the head is polled by the system controller 90, and a detector interrupt enabled when a quadrature gauge rod has been detected and triggered each time one of the phototransistors 52 and 53 changes state. The latter interrupt is illustrated in FIG. 11 and is designated 150. Essentially, this routine monitors the PHASE outputs of the phototransistors 52 and 53 to determine the direction in which the gauge rod is moving, and does so by alternately testing the PHASE A line 77 and the PHASE B line 78. The routine maintains a count of the number of passes through the routine, starting at a top-of-rod reference, which is set at the output of the QUAD subroutine of FIG. 10. By reason of the quadrature arrangement of the optical sensors, wherein the PHASE A and PHASE B signals are 90° out of phase with each other, the routine checks to see which phase is leading. If PHASE A (lower phototransistor 53) leads PHASE B, this indicates that the rod is moving up, whereas if PHASE B is leading, the rod is moving down. The logic can best be understood with reference to FIG. 6, which illustrates the waveform diagrams of the PHASE A and PHASE B signals starting from a top-of-rod reference position. The detector interrupt routine 150 is called each time the microprocessor experiences an edge or a change of state in either of the PHASE A or PHASE B signals.

Referring to FIG. 6, as the rod moves from the top-of-rod position, the first transition experienced is the change of state of PHASE A from a high to a low condition at edge 1. Referring to FIG. 11, the routine first saves appropriate pointer, accumulator and status information and then checks at 151 to see if the counter is enabled. If not, this is a spurious interrupt and the routine then resets the pointer, accumulator and status and returns to the main loop. If the counter is enabled, the routine gets the phase bits, saves the information from the last pass for this routine and checks at 152 to see if the Test A flag is set, i.e., to see if PHASE A was tested during the last pass during through the routine. Assuming, for purposes of illustration, that the system is starting at the top of the rod, the answer would be no and the routine checks at 153 to see if the current PHASE A signal is high. In the example it is not, so the routine sets the Test A flag, checks at 154 to see if the direction is set at DOWN. In the present instance it is not, since it was reset at the top of the rod. The routine then sets the counting status, increments the count and returns. As the rod continues moving up, the next interrupt occurs and edge 2 when the PHASE B signal goes low. This time, at 152 the Test A flag is set, so the routine proceeds down a leg to test the PHASE B signal, checking at 155 to see if PHASE B is currently high. It is not, so the routine checks at 156 to see if the last PHASE B was low. It was not so the routine checks at 157 to see if the last PHASE A (at transition 1) was high. It was not, so the routine sets the direction as being up and returns.

At edge 3 of the PHASE A signal, the Test A flag is not set at 152, but at 153 the current PHASE A is high, so the routine checks at 158 to see if the last PHASE A was high. Since it was not, the routine checks at 159 to see if the last PHASE B was high. Since it was not, the direction is still up. At edge 4, the Test A flag is set at 152 and, at 155, the PHASE B signal is high, so the routine clears the Test A flag and continues in the same direction. A rod continues moving up, succeeding edges cause the routine to repeat the procedures at edges 1–4.

In the center of FIG. 6, the rod stops and maintains its position for an indeterminate period of time with both PHASES high, after which it reverses direction, starting to move down. In this case, the first transition will be seen by the upper phototransistor 52, creating PHASE B transition 5. Since the last pass through the routine was also a test of PHASE B, the Test A flag is not set at 152, so the routine moves to 153 and, finding the current PHASE A high and finding the last PHASE A also high at 158, moves to 160 to see if the current PHASE B is high. Since it is not, it clears the direction back to its down condition and, finding the down direction set at 154, sets the counting status accordingly and decrements the count. The routine then checks at 161 to make sure that the counter is not trying to count below zero, which would indicate an error, and then returns.

As the rod continues moving down, at the next edge 6, the Test A flag again is not set at 152 and, since the current PHASE A is low at 153, the routine sets the Test A flag and continues in the same direction. At edge 7, the Test A flag is set at 152 and PHASE B is high at 155, so the routine again continues in the same direction after clearing the Test A flag. At edge 8, the routine proceeds to 153, where PHASE A is high and, since the last PHASE A was low at 158 and the last PHASE B was high at 159, the routine clears the direction flag to down and continues in the same direction. At edge 9, the routine proceeds down to PHASE B leg and, finding the current PHASE B low at 155 and the last PHASE B not low at 156, checks at 162 to see if the current PHASE A is high and, since it is, continues in the up direction. It is believed that the other possible logical permutations will be readily understandable from the foregoing description.

Figure 12:
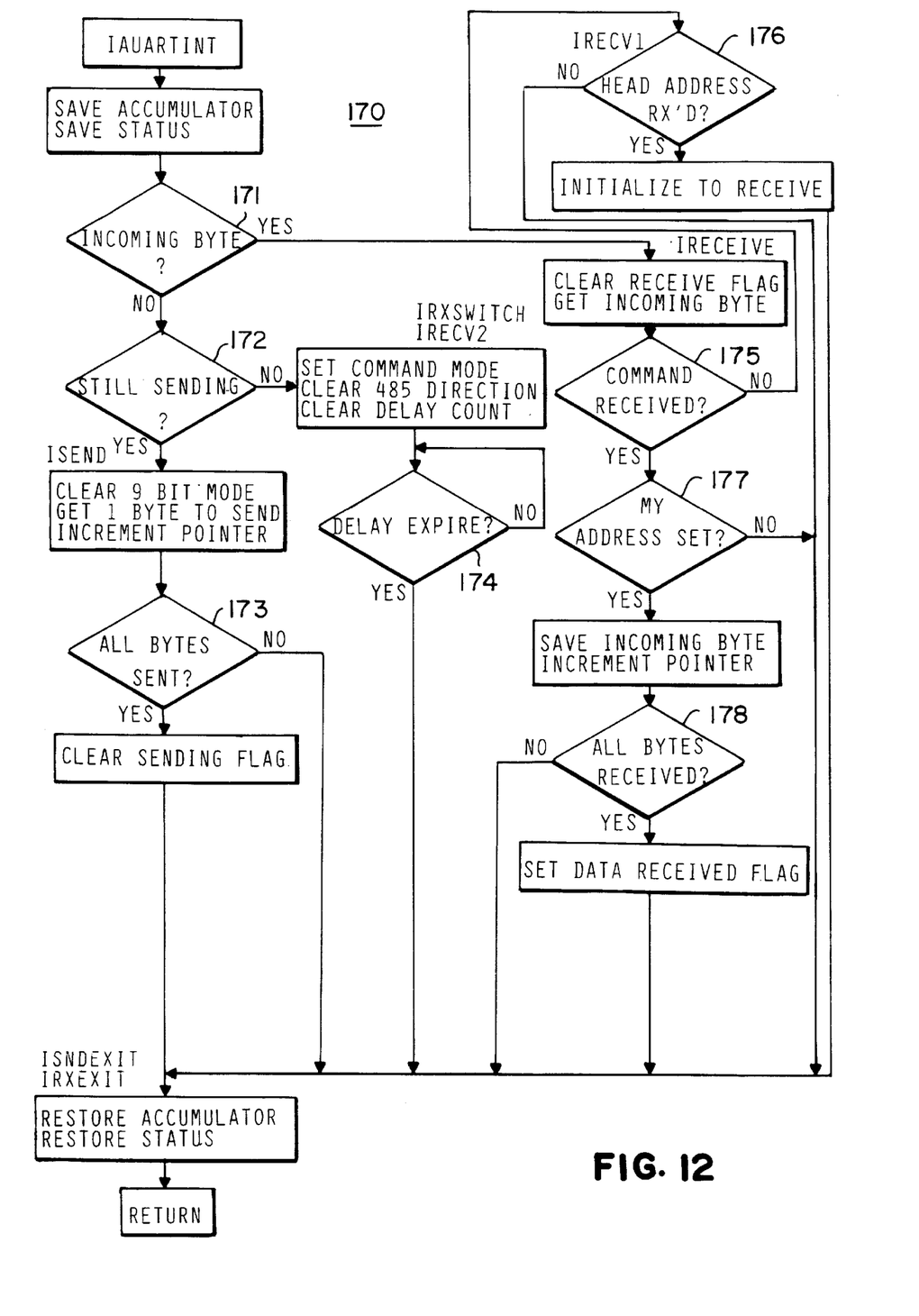

Referring now to FIG. 12, the Serial Interrupt subroutine is generally designated 170 and, upon being called, first saves the accumulator and status information and checks at 171 to see if there is an incoming byte. If not, it checks at 172 to see if it is still sending an outgoing message. If so, it gets another byte to send and increments the pointer and then checks at 173 to see if all bytes have been sent. If not it restores the accumulator and status and returns and, if so, it clears the transmit flag. If, at 172, the head is not still sending, the routine sets the command mode accordingly, and clears the direction and count, waits for the transceiver to settle at 174 and returns. If there is an incoming byte at 171, the routine clears the receive flag, gets the incoming byte and checks at 175 to see if the incoming signal is recognized as a command. If not it checks to see if the proper head address has been received at 176 and, if so, initializes the system to receive. If at 175 a command has been received, the routine checks at 177 to see if the head address is set. If not it returns and if so it saves the incoming byte, increments the pointer and checks at 178 to see if all of the bytes have been received. After they have been the data received flag is set.

From the foregoing, it can be seen that there has been provided a tank level gauge and sensor head therefor, which has universal application to both magnetic and optical gauge rods.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A universal sensor head for use with different types of variety of elongated gauge rods in a gauge system for indicating the level of liquid in a tank, said sensor head comprising:

a code sensor including two optical detectors disposed for cooperation to detect a linear code pattern on an associated gauge rod movable longitudinally past the code sensor and generating corresponding electrical signals to indicate the direction of movement of the gauge rod, a magnetic sensor including a magnet detector disposed for detecting proximity of a magnet on the associated gauge rod and generating corresponding electrical signals to establish a reference position of the gauge rod, and a processor coupled to said code sensor and to said magnetic sensor and operating under stored program control for interpreting the electrical signals and generating corresponding output signals indicative of the position of the gauge rod relative to the sensor head.

2. The sensor head of claim 1, and further comprising a light source disposed for illuminating the associated gauge rod and the code pattern thereon.

3. The sensor head of claim 2, wherein said light source includes a light-emitting diode.

4. The sensor head of claim 1, wherein each of said optical detectors includes a phototransistor.

5. The sensor head of claim 1, wherein said magnet detector includes a reed switch.

6. The sensor head of claim 1, wherein said two optical detectors are coupled in quadrature relationship with respect to the code-bearing surface.

7. The sensor head of claim 1, wherein said magnetic sensor includes two magnet detectors.

8. The sensor head of claim 1, wherein said processor includes means for identifying the type of associated gauge rod being sensed by said sensors.

9. A linear distance gauge comprising:

an elongated and longitudinally movable code-bearing surface, a fixed code sensor including two optical detectors disposed relative to the code-bearing surface for detecting the code thereon and generating corresponding electrical signals indicating the direction of movement of the code-bearing surface, at least one magnet disposed adjacent to an end of the code-bearing surface, a fixed magnetic sensor including a magnet detector disposed for sensing proximity of the magnet and generating a corresponding electrical signal to establish a reference position of the code-bearing surface, and a processor coupled to the code sensor and to the magnetic sensor and operating under stored program control for interpreting the electrical signals and generating corresponding output signals indicating the position of the code-bearing surface relative to said sensors.

10. The gauge of claim 9, wherein said code-bearing surface includes a plurality of equal-height reflecting and non-reflecting stripes alternating longitudinally along the surface.

11. The gauge of claim 9, and further comprising a light source disposed for illuminating the associated gauge rod and the code-bearing surface thereon.

12. The gauge of claim 11, wherein said light source includes a light-emitting diode and each of said optical detectors includes a phototransistor.

13. The gauge of claim 9, wherein said at least one magnet is a first magnet and said end is a first end, and further comprising at least one second magnet disposed adjacent to a second end of the code-bearing surface.

14. The gauge of claim 13, wherein said magnetic sensor includes two magnet detectors.

15. The gauge of claim 13, and further comprising at least one-third magnet disposed intermediate the ends of the code-bearing surface.

16. A float gauge for measuring liquid level in a vessel comprising:

a float element floating in the liquid for rising and falling with the level thereof, an elongated code-bearing surface coupled to the float element for rising and falling therewith, a code sensor fixed relative to the vessel and including two optical detectors disposed relative to the code-bearing surface for detecting the code thereon and generating corresponding electrical signals indicating the direction of movement of the code-bearing surface, a magnet at an end of the code-bearing surface, a magnetic sensor including a magnet detector fixed relative to the vessel and disposed for sensing proximity of the magnet and generating a corresponding electrical signal to establish a reference position of the code-bearing surface, and a processor coupled to the code sensor and the magnetic sensor and operating under stored program control for interpreting the electrical signals and generating corresponding output signals indicating the position of the code-bearing surface relative to its reference position for indicating the liquid level.

17. The float gauge of claim 16, wherein said code-bearing surface includes a plurality of equal-height reflecting and non-reflecting stripes alternating longitudinally along the surface.

18. The float gauge of claim 17, wherein said two optical detectors are coupled in quadrature relationship with respect to the code-bearing surface.

19. The gauge of claim 16, wherein said magnet is a first magnet and said end is a first end, and further comprising a second magnet disposed at a second end of the code-bearing surface.

20. The gauge of claim 19, wherein said magnetic sensor includes two magnet detectors.

* * * * *